Nov. 21, 1933.   L. E. KOCH   1,935,909
ELECTRICAL SWITCH
Filed Feb. 4, 1929   2 Sheets-Sheet 2

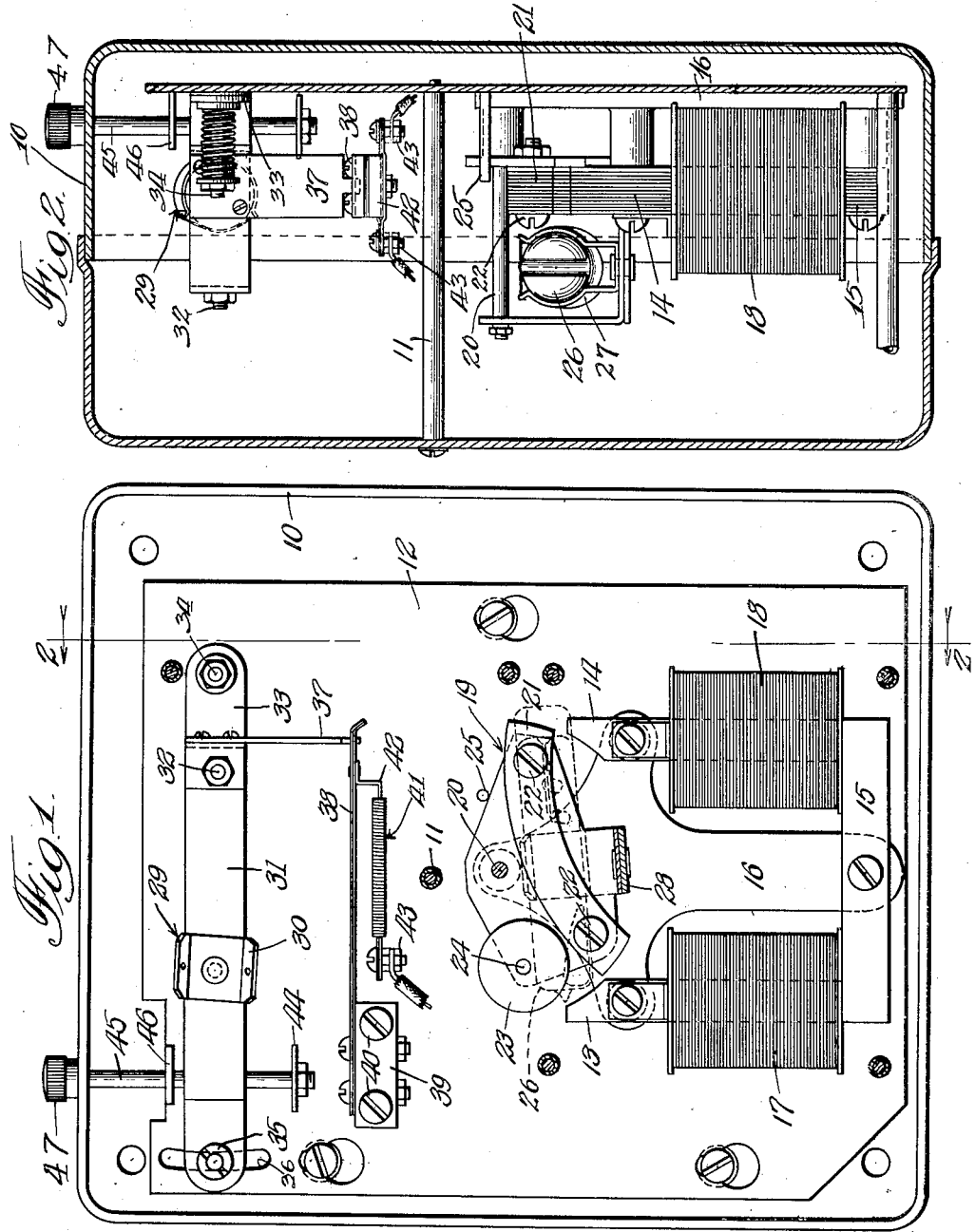

Inventor:
LAWRENCE E. KOCH.

Patented Nov. 21, 1933

1,935,909

UNITED STATES PATENT OFFICE 1,935,909

ELECTRICAL SWITCH

Lawrence E. Koch, Elkhart, Ind., assignor, by mesne assignments, to Minneapolis-Honeywell Regulator Company, Minneapolis, Minn., a corporation of Delaware Application February 4, 1929. Serial No. 337,334

1 Claim. (Cl. 200—116)

This invention relates to an electrical switch and has special reference to a safety switch responsive to normal and abnormal conditions of a control circuit in which the same may be embodied.

More particularly this invention has reference to a safety electrical switch for controlling the operation of an automatic heating system, the switch comprising a pair of tiltable switching members, one of which members is thermally actuated by electrical current in the control circuit to terminate the operation of the system during an abnormal condition thereof, and the other of which is actuated by magnetically operated means to terminate the operation of the system during an abnormal condition thereof, governed by the failure or serious reduction of voltage in the control circuit.

In addition to a safety switch of the aforementioned type, the control circuit of an automatic heating system embodies a monitoring device actuated by temperatures in the stack of a boiler or furnace and thus the monitoring device is dependent upon proper burner operation for giving sequence to the operation of the system. Other devices employed in the control circuit of an automatic heating system may include a primary control such as a room thermostatic switch which may be disposed in a room or other enclosure to guard against excessive variations in temperatures therein, a thermostatic switch for limiting the range of temperature or pressure in a furnace or boiler, a motor for controlling the fuel supply to the burner and means for controlling the ignition of the fuel supply.

When the room thermostatic switch closes, one of a pair of electromagnets operates one of the tiltable switches of the safety electrical switch to close the electrical circuit through the motor, the thermally operated actuator of the other of said tiltable switches of said safety switch being energized thereby together with the ignition means. Under normal conditions, the operation of the burner will control the monitoring device to give a proper sequence in the operation of the system whereby the thermally operated actuator and the ignition means will be de-energized and the other of said pair of electromagnets will operate in lieu of the first electromagnet to hold the first tiltable switch or motor switch in normal running position with the motor energized.

Should ignition fail to take place within a predetermined time limit, the thermally operated actuator will remain energized for an undue length of time and thereby actuate the second tiltable switch into an open circuit position whereby the operation of the system is terminated and further operation cannot take place until the safety switch is manually restored to normal operative position. However, should proper ignition be obtained but failure or serious reduction of voltage occur, the second electromagnet will be de-energized to open the motor circuit. Should voltage resume, the second electromagnet lacks sufficient power to close the motor switch and the system remains inoperative until the monitoring device brings about complete recycling with ignition.

One of the objects of this invention is to provide a safety switch operable under all abnormal conditions to terminate the operation of an automatic system and capable of full automatic normal operation;

Another object of this invention is to provide a safety switch wherein the desired period for ignition can be accurately secured by means of a simple adjustable mounting for one of the switching members thereof.

A further object of this invention is to provide a safety switch which is simple and dependable in operation, may be easily installed and is simple and durable in construction.

Other objects and advantages will hereinafter be more fully described, and for a more complete understanding of the characteristic features of this invention, reference may now be had to the following description and accompanying drawings, in which latter:

Figure 1 is a front elevational view of the safety electrical switch embodied in this invention;

Figure 2 is a vertical sectional view taken on the line 2—2 of Fig. 1;

Figure 3:
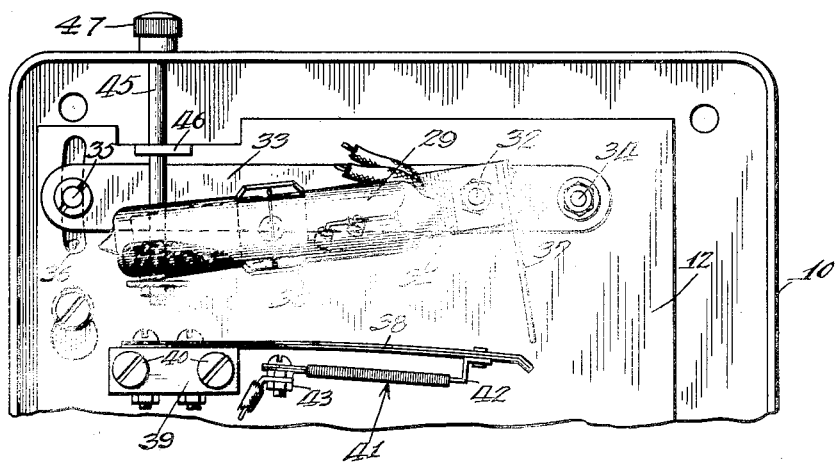
Fig. 3 is a view of a portion of Fig. 1 showing a changed position of one of the operating mechanisms therein.
Figure 4:
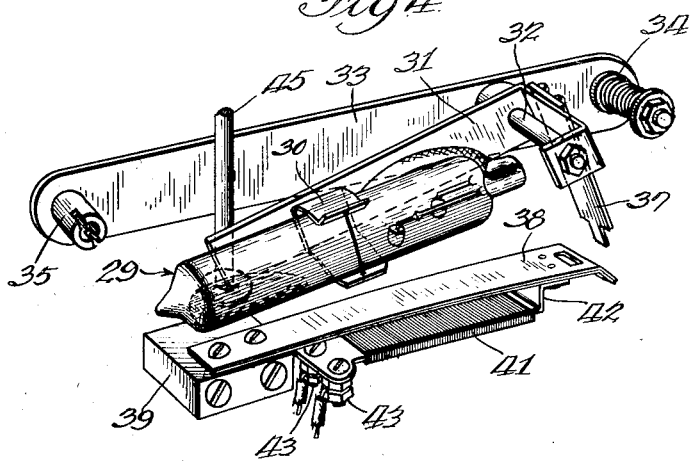
Fig. 4 is a perspective view of the operating mechanism which when actuated by line current is capable of being restored by manual means only.

Referring now to the drawings, and more particularly to Figs. 1 to 3 inclusive, the safety electrical switch comprises a casing 10 having a cover preferably removably secured thereto as by means of a screw member engaging a central supporting member 11 extending from and attached to the mounting plate 12. The mounting plate is in turn secured to the rear wall of the casing 10 as by means of screws projecting therethrough and through spacers secured between the mounting plate and the rear wall. The mounting plate is for the purpose of holding the operating mechanism in order that the assembly of the mechanism may be greatly facilitated.

An electromagnet comprising a pair of vertically extending arm members 13 and 14 connected at their lower ends by means of a horizontally extending member 15 is rigidly secured to a bracket 16 which latter is suitably secured to the mounting plate 12. The members 13, 14, and 15 are preferably formed of iron laminæ to form the iron circuit of the electromagnet which is shown in the drawings as of the horse-shoe type. A pair of coils 17 and 18 are disposed on the vertically extending arms 13 and 14, respectively, the coil 18 being hereinafter termed a "hold" coil and the coil 17 being hereinafter termed a "pull" coil by reason of their characteristics which will hereinafter be more fully pointed out.

An armature 19 is preferably pivotally mounted on a pin 20 extending through the upper end thereof and into a suitable bearing portion on the mounting plate 12. The armature 19 preferably comprises a plate having a core portion 21 disposed thereon and secured thereto by means of screws 22. The core portion 21 is preferably composed of iron laminæ arcuate in shape, the ends thereof being arcuate and co-extensive with and adjacent to the arcuate upper ends of the vertically extending members 13 and 14 when the armature is in one of its predetermined positions. However, a weight 23 is mounted on the left-hand side of the armature in order to normally hold the armature in a position such that the core portion 21 is held out of the influence of the iron circuit formed through the electromagnetic coils. A stop member 25 is provided for limiting the movement of the armature when the latter is urged to rotate on the pivot 20 by the weight 23 and is preferably secured to the mounting plate 12.

A tiltable mercury contactor tube 26 is mounted on the armature 19 and comprises a hermetically sealed glass container having a pair of spaced cooperating electrodes disposed adjacent one end thereof and a body of current conducting fluid such as mercury, also disposed therein, to bridge or to flow away from the electrodes in order to make or to break an electrical circuit therethrough when tilted into its various predetermined positions. The tube 26 is mounted in a clip 27 which latter is in turn fixedly mounted to an arm 28 preferably formed integrally with and extending outwardly and thence upwardly from the plate of the armature 19 to form a substantially U-shaped bracket. The upper end of the arm 28 is likewise pivotally mounted on the pin 20 to determine definitely the proper position of the tube 26 and to provide an efficient bearing construction.

The normal inoperative position of the armature 19 is shown in Fig. 1 of the drawings wherein the weighted member 23 urges the armature in a dirction whereby the plate is limited in its movement by the stop member 25. In this position of the armature, the mercury in the contactor rests at the left-hand end thereof away from the electrodes.

In the operation of the switching mechanism just described, when the pull coil 17 is energized, sufficient energy is obtained therethrough to rotate the armature 19 to a position wherein the lines of force thread through the ends of the vertically extending members 13 and 14 and the core portion 21 of the armature 19 to complete a maximum magnetic field through the pull coil portion of the electromagnet, the iron circuit being completed through the members 13, 15, 14, and 21. In this condition of the armature 19, the mercury has shifted to the right to bridge the electrodes and to establish an electrical circuit therethrough.

The hold coil 18 as will hereinafter be more particularly pointed out with reference to the electrical control circuit, is energized just prior to the de-energization of the pull coil 17. The hold coil 18 has just sufficient power to hold the armature 19 in the position into which the pull coil has operated the armature, but lacks sufficient power to operate the armature into such a position from its normal inoperative position. After once having de-energized the hold coil 18, the weight 23 rotates the armature 19 to its normal inoperative position, and thereafter should the hold coil 18 be energized it will have insufficient power to attract the armature to close the electrical circuit through the contactor.

A second tiltable electrical switch 29, comprising a sealed container having a pair of spaced cooperating electrodes disposed adjacent one end thereof and a body of electrical conducting fluid likewise disposed therein for bridging or flowing away from the electrodes, is mounted in a clip 30 which latter is in turn fixedly mounted on an arm 31. One end of arm 31 is formed into a U-shaped portion and is pivoted thereat on a pin 32 extending from an arm 33. The latter arm 33 is pivotally mounted as at 34 to the mounting plate 12 and extends laterally of the casing, the free end thereof being adapted to be adjustable in various fixed positions by means of a screw member 35 extending through a slot 36 and engaging the walls thereof in any suitable manner. For example, a threaded screw having an enlarged head extends through the slot 36 and through an aperture in the arm 33 and has a cap on the outside of the arm which is internally threaded to engage the screw, thereby clamping the head of the screw and the arm 33 to the fixed mounting plate 12. When it is desired to raise or lower the arm 33, the cap of the screw is loosened whereafter the free end of the arm 33 is raised or lowered on its pivot 34 into a desired position, and the cap is screwed tightly to hold the arm in that position. However, should the cap 35 become loosened a frictional securing element is disposed on the pivotal end 34 to restrain any movement of the arm 33. The frictional means comprise a screw which extends from the mounting plate on which the arm is mounted, a washer and nut being mounted on the outer end thereof and having a coil spring between the washer and the arm to urge the latter in a tight frictional engagement with the mounting plate.

A depending member 37 is fixedly secured to the U-shaped portion of the arm 31 and extends to engage an aperture in a horizontally extending bi-metallic element 38. The aperture is preferably disposed on the outermost portion of the free end of the bi-metallic element 38, the other end thereof being fixedly mounted on an insulating support 39 which latter is fixedly mounted as by means of screws 40 to the mounting plate 12. The bi-metallic element 38 is of the usual type comprising a pair of metal strips of different co-efficients of expansion intimately united along their adjacent and abutting edges. The bi-metallic element 38 is adapted to warp in a direction downwardly or away from the above mentioned arms 31 and 33 when actuated by thermal means.

A resistor 41 is mounted on the underneath side of the bi-metallic element 38, the resistor comprising a metallic member 42 preferably of brass secured at one end thereof to the bi-metallic element 38 and extending preferably parallel therewith along substantially the entire length thereof. A resistance wire is wound around insulating strips provided on each side of the supporting member 42 and the wire is thereby held in an insulated relation therefrom. The ends of the resistance wire are fastened to terminal posts 43 secured to the insulating strips and are connected in the electrical control circuit as will hereinafter be more fully explained.

In the operation of the mechanism just recited when the resistor 41 is energized, heat therefrom will rise and tend to warp the bi-metallic member 38, thereby releasing the arm 37 from the aperture in the bi-metallic member which it engages. The weight of the contactor tube 29 will cause the arm 31 to pivot on the pin 32 to a position such as is clearly shown in Fig. 3. Ordinarily an electrical circuit exists through the contactor 29 for the reason that the electrodes are disposed on the right-hand end and the tube is slightly tilted toward that end in a normal operative position whereby the mercury flows thereto to bridge the electrodes. Thereafter, when the arm 31 falls to the position shown in Fig. 3 by the weight of gravity, the mercury flows away from the electrodes to break the electrical circuit existing therethrough.

In order to prevent another cycle of operation after an abnormal condition of the system has obtained before the attendant is made aware of the condition of the system, it is desirable that a complete recycling of the system is not possible excepting by the manual restoration of the safety switch. Therefore, the arm 31 stops against a washer 44 disposed on the lower end of a rod 45 which latter extends through an aperture in a bracket 46 formed on the mounting plate 12 and thence through the casing 10. A knob 47 is fixedly mounted on the upper end of the rod 45 and limits the downward movement thereof. In resetting the switch 29 it is not necessary to remove the cover of the casing, it being only necessary to raise the knob 47 whereafter the washer 44 urges the arm 31 upwardly until the depending member 37, secured to the pivotal end thereof, engages the aperture in the bi-metallic arm 38. Thus, by means of the engagement of the depending member 37 in the aperture of the bi-metallic element 38, the switch 29 is held in a normal closed circuit position.

By reason of the arm 33 being pivotally mounted and therefore adjustable, the pivotal mounting 32 for the arm 31 is likewise adjustable. A movement upwardly or downwardly of the arm 33 will raise or lower the pivotal mounting pin 32 and thus raise or lower the depending member 37 which engages an aperture in the bimetallic element 38. It will thus be apparent that when the depending member 37 is lowered into the aperture, a greater movement of the bimetallic element 38 is required and therefore a greater amount of energy is required in the resistor 41 in order to permit a disengagement therebetween. Conversely, when the depending member 37 is moved upwardly a less amount of flexing of the bimetallic element 38 and consequent energy in the resistor 41 is necessary to disengage these members. By this simple slot adjustment, the ignition period can be extended or reduced to suit each individual installation.

To specifically illustrate the function of the safety switch a brief recitation of a central system will be related now. However, for a more complete understanding of a control circuit in which this switch may be embodied, reference may be had to a copending application of this applicant filed concurrently herewith, Serial No. 337,333.

When a predetermined condition of a room thermostatic switch or other primary control is established, the pull coil 17 is energized to actuate the armature 19 thereby changing the circuit connections through the contactor 26 to close the circuit connections through the fuel supplying means, ignition means and the resistor 41. Under normal conditions the monitoring device responsive to conditions of combustion in the heating system will be energized to give proper sequence to the system thereby disconnecting the resistor, ignition means and pull coil from the circuit. However, the hold coil 18 will be energized before the pull coil is deenergized to maintain a supply of energy to the motor.

Should ignition fail to take place within a predetermined time limit, the resistor 41 will remain energized for an undue length of time and thereby warp the bimetallic element 38 to release the depending arm 37 whereby the circuit connection through the contactor 29 is changed and the operation of the system is terminated. As before pointed out, further operation of the system cannot take place until the contactor 29 is manually restored to normal operative position.

While but a single embodiment of this invention has been herein shown and described, it is to be understood that various modifications thereof will be apparent to those skilled in the art without departing from the spirit and scope of the invention, and therefore the same is to be limited only by the scope of the prior art and the appended claim:

I claim:

In a device of the character described, a mercury tube contactor, a pivotal arm on which said contactor is mounted, independently adjustable means for regulatably and fixedly securing said pivotal arm, and a thermally operated actuator having an aperture therein, said arm having a projecting portion for engaging said aperture to hold said contactor in a normal operative position, said actuator when heated to a predetermined degree operating to disengage said aperture and said projection to allow said contactor to tilt by gravity to a second position, whereafter said contactor may be restored only by manual means.

LAWRENCE E. KOCH.